US009398679B2

(12) United States Patent
Namburu

(10) Patent No.: US 9,398,679 B2
(45) Date of Patent: Jul. 19, 2016

(54) AIR COOLED PLASMA TORCH AND COMPONENTS THEREOF

(71) Applicant: LINCOLN GLOBAL, INC., City of Industry, CA (US)

(72) Inventor: Praveen K. Namburu, Charleston, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 124 days.

(21) Appl. No.: 14/281,848

(22) Filed: May 19, 2014

(65) Prior Publication Data

US 2015/0334817 A1 Nov. 19, 2015

(51) Int. Cl.
*B23K 10/00* (2006.01)
*H05H 1/34* (2006.01)

(52) U.S. Cl.
CPC ......... *H05H 1/34* (2013.01); *H05H 2001/3442* (2013.01); *H05H 2001/3447* (2013.01); *H05H 2001/3478* (2013.01); *H05H 2001/3489* (2013.01)

(58) Field of Classification Search
CPC ... H05H 1/34; H05H 1/26; H05H 2001/3457; H05H 2001/3442
USPC ............. 219/121.49, 121.48, 121.51, 121.52, 219/121.5, 75
See application file for complete search history.

(56) References Cited

U.S. PATENT DOCUMENTS 4,967,055 A 10/1990 Raney et al.
5,464,962 A 11/1995 Luo et al.
5,601,734 A 2/1997 Luo et al.
5,695,662 A 12/1997 Couch, Jr. et al.
5,747,767 A 5/1998 Severance et al.
5,756,959 A 5/1998 Freeman et al.
5,767,478 A 6/1998 Walters
5,841,095 A 11/1998 Lu et al.
5,886,315 A 3/1999 Lu et al.
5,977,510 A 11/1999 Lindsay et al.
5,994,663 A 11/1999 Lu
6,020,572 A 2/2000 Marner et al.
6,066,827 A 5/2000 Nemchinsky
6,084,199 A 7/2000 Lindsay et al.
6,114,650 A 9/2000 Marner et al.
6,130,399 A 10/2000 Lu et al.
6,207,923 B1 3/2001 Lindsay et al.

(Continued)

FOREIGN PATENT DOCUMENTS

DE 102004049445 A1 4/2006
DE 202006018163 U1 3/2007

(Continued)

OTHER PUBLICATIONS

International Application No. PCT/IB2015/001412, International Search Report & Written Opinion, 12 pages, Feb. 9, 2016.

(Continued)

*Primary Examiner* — Mark Paschall
(74) *Attorney, Agent, or Firm* — Perkins Coie LLP

(57) ABSTRACT

Embodiments of the present invention are directed to an air cooled, retract-start plasma cutting torch having improved performance. The torch comprises any one, or a combination of an improved nozzle, electrode, shield cap and swirl ring, where these components have improved geometries and physical properties which optimize plasma jet performance during cutting.

18 Claims, 8 Drawing Sheets

(56) References Cited

U.S. PATENT DOCUMENTS

| | | | |
|---|---|---|---|
| 6,403,915 | B1 | 6/2002 | Cook et al. |
| 6,423,922 | B1 | 7/2002 | Nemchinsky et al. |
| 6,424,082 | B1 | 7/2002 | Hackett et al. |
| 6,452,130 | B1 | 9/2002 | Qian et al. |
| 6,483,070 | B1 | 11/2002 | Diehl et al. |
| 6,614,001 | B2 | 9/2003 | Hackett et al. |
| 6,686,559 | B1 | 2/2004 | Walters et al. |
| 6,841,754 | B2 | 1/2005 | Cook et al. |
| 6,946,617 | B2 | 9/2005 | Brandt et al. |
| 6,969,819 | B1 | 11/2005 | Griffin et al. |
| 7,019,255 | B2 | 3/2006 | Brandt et al. |
| 7,081,597 | B2 | 7/2006 | Severance, Jr. et al. |
| 7,193,174 | B2 | 3/2007 | Brandt et al. |
| 7,256,366 | B2 | 8/2007 | Severance et al. |
| 7,375,302 | B2 | 5/2008 | Twarog et al. |
| 7,375,303 | B2 | 5/2008 | Twarog et al. |
| 7,423,235 | B2 | 9/2008 | Severance, Jr. et al. |
| 7,435,925 | B2 | 10/2008 | Griffin et al. |
| 7,598,473 | B2 | 10/2009 | Cook et al. |
| 7,605,340 | B2 | 10/2009 | Duan et al. |
| 7,659,488 | B2 | 2/2010 | Cook et al. |
| 7,754,993 | B2 | 7/2010 | Ortega et al. |
| 7,829,816 | B2 | 11/2010 | Duan et al. |
| 7,989,727 | B2 | 8/2011 | Twarog et al. |
| 8,035,055 | B2 | 10/2011 | Twarog et al. |
| 8,089,025 | B2 | 1/2012 | Sanders et al. |
| 8,097,828 | B2 | 1/2012 | Roberts et al. |
| 8,101,882 | B2 | 1/2012 | Mather et al. |
| D654,104 | S | 2/2012 | Fitzpatrick et al. |
| 8,115,136 | B2 | 2/2012 | Mather et al. |
| 8,153,927 | B2 | 4/2012 | Twarog et al. |
| 8,212,173 | B2 | 7/2012 | Liebold et al. |
| 8,304,684 | B2 | 11/2012 | Smith et al. |
| 8,338,740 | B2 | 12/2012 | Liebold et al. |
| 8,389,887 | B2 | 3/2013 | Currier et al. |
| 8,395,077 | B2 | 3/2013 | Duan et al. |
| 8,525,069 | B1 * | 9/2013 | Mather .................... H05H 1/34 219/119 |
| 8,541,712 | B2 | 9/2013 | Mather et al. |
| D692,402 | S | 10/2013 | Dalton et al. |
| 8,546,718 | B2 | 10/2013 | Mather et al. |
| 8,546,719 | B2 | 10/2013 | Warren, Jr. et al. |
| 8,581,139 | B2 | 11/2013 | Severance, Jr. et al. |
| 8,633,417 | B2 | 1/2014 | Ashtekar et al. |
| 8,698,036 | B1 | 4/2014 | Kornprobst et al. |
| 8,759,709 | B2 | 6/2014 | Mather et al. |
| 8,772,667 | B2 | 7/2014 | Yang et al. |
| 8,829,385 | B2 | 9/2014 | Yang et al. |
| 2002/0185475 | A1 | 12/2002 | Horner-Richardson et al. |
| 2004/0169018 | A1 | 9/2004 | Brasseur et al. |
| 2004/0211760 | A1 * | 10/2004 | Delzenne ............... B23K 10/00 219/121.44 |
| 2006/0163216 | A1 | 7/2006 | Brandt et al. |
| 2012/0012560 | A1 | 1/2012 | Roberts et al. |
| 2013/0043224 | A1 | 2/2013 | Leiteritz et al. |
| 2013/0306607 | A1 | 11/2013 | Mather et al. |
| 2014/0021175 | A1 | 1/2014 | Chen et al. |
| 2014/0110382 | A1 | 4/2014 | Beliveau et al. |

FOREIGN PATENT DOCUMENTS

| | | | |
|---|---|---|---|
| EP | 0729805 | A1 | 4/1996 |
| EP | 0790756 | A2 | 8/1997 |
| WO | 9953734 | A1 | 10/1999 |
| WO | 0028794 | A1 | 5/2000 |
| WO | 2006113737 | A2 | 10/2006 |
| WO | 2008101226 | A1 | 2/2008 |
| WO | 2010111695 | A1 | 9/2010 |
| WO | 2012118826 | A1 | 9/2012 |
| WO | 2014187438 | A1 | 11/2014 |

OTHER PUBLICATIONS

International Application No. PCT/IB2015/000683 International Search Report & Written Opinion, 12 pages, Aug. 31, 2015.

International Application No. PCT/IB2015/000702, International Search Report & Written Opinion, 14 pages, Aug. 25, 2015.

International Application No. PCT/IB2015/000714, International Search Report & Written Opinion, 10 pages, Aug. 31, 2015.

International Application No. PCT/IB2015/001694, International Search Report & Written Opinion, 14 pages, Dec. 23, 2015.

* cited by examiner

AIR COOLED PLASMA TORCH AND COMPONENTS THEREOF

TECHNICAL FIELD

Devices, systems, and methods consistent with the invention relate to cutting, and more specifically to devices, systems and methods related to plasma arc cutting torches and components thereof.

BACKGROUND

In many cutting, spraying and welding operations, plasma arc torches are utilized. With these torches a plasma gas jet is emitted into the ambient atmosphere at a high temperature. The jets are emitted from a nozzle and as they leave the nozzle the jets are highly under-expanded and very focused. However, because of the high temperatures associated with the ionized plasma jet many of the components of the torch are susceptible to failure. This failure can significantly interfere with the operation of the torch and prevent proper arc ignition at the start of a cutting operation.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is an air cooled plasma torch having and components thereof that are designed to optimize performance and durability of the torch. Specifically, exemplary embodiments of the present invention can have an improved electrode, nozzle, shield and/or swirl ring configuration.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to air cooled plasma arc torches useful various cutting, welding and spraying operations. Specifically, embodiments of the present invention are directed to air cooled plasma arc torches. Further exemplary embodiments are directed to air cooled plasma arc torches which are retract arc torches. As generally understood, retract arc torches are torches where the electrode is in contact with the nozzle for arc initiation and then the electrode is retracted from the nozzle so that the arc is then directed through a throat of the nozzle. In other types of retract torches, the electrode stays stationary and the nozzle is moved. Embodiments of the present invention apply to both types. The construction and operation of these torches are generally known, and thus their detailed construction and operation will not be discussed herein. Further, embodiments of the present invention can be used in either handheld or mechanized plasma cutting operations. It should be noted that for purposes of brevity of clarity, the following discussion will be directed to exemplary embodiments of the present invention which are primarily directed to a hand held plasma torch for cutting. However, embodiments of the present invention are not limited in this regard and embodiments of the present invention can be used in welding and spraying torches without departing from the spirit or scope of the present invention. Various types and sizes of torches are possible at varying power levels if desired. For example, exemplary embodiments of the present invention can be used on cutting operation that utilize a cutting current in the range of 40 to 100 amps, and can cut workpieces having a thickness of up to 0.075 inches, and in other embodiments can cut workpieces of a thickness of up to 1.5 inches. Further, the torches and components described herein could be used for marking, cutting or metal removal. Additionally, exemplary embodiments of the present invention, can be used with varying currents and varying power levels. The construction and utilization of air coolant systems of the type that can be used with embodiments of the present invention are known and need not be discussed in detail herein.

Figure 1:
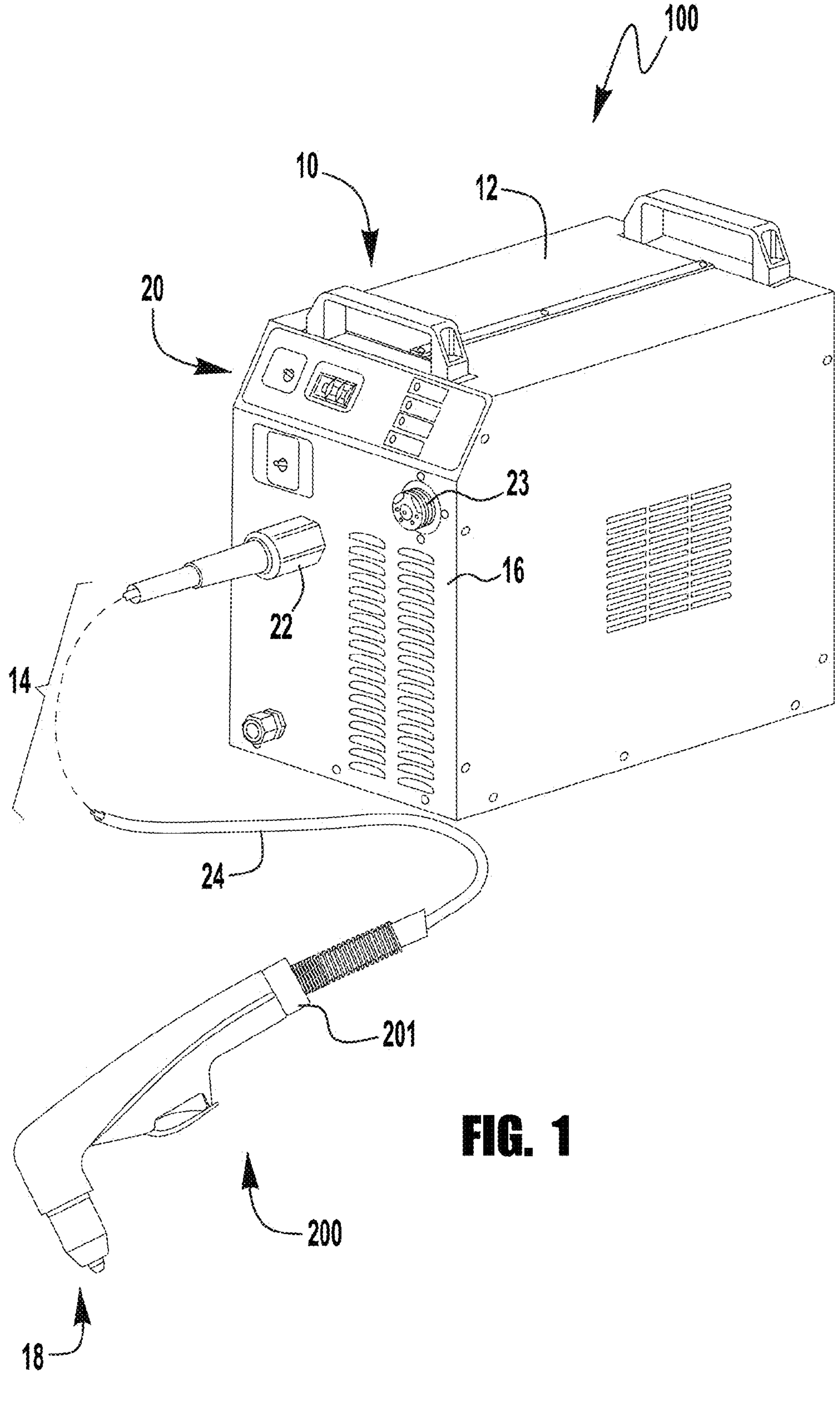
FIG. 1 is a diagrammatical representation of an exemplary cutting system which can be used with embodiments of the present invention.

Turning now to FIG. 1, an exemplary cutting system 100 is shown. The system 100 contains a power supply 10 which includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch 200 in connection with the relevant portions within housing 12. The torch 200 shown in FIG. 1 has a connector 201 and is of the handheld type, but as explained above the torch 200 can be of the mechanized type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes, and some of these components will be discussed in more detail below. Specifically, the some of the components discussed below, include the torch electrode, nozzle, shield and swirl ring.

Figure 2:
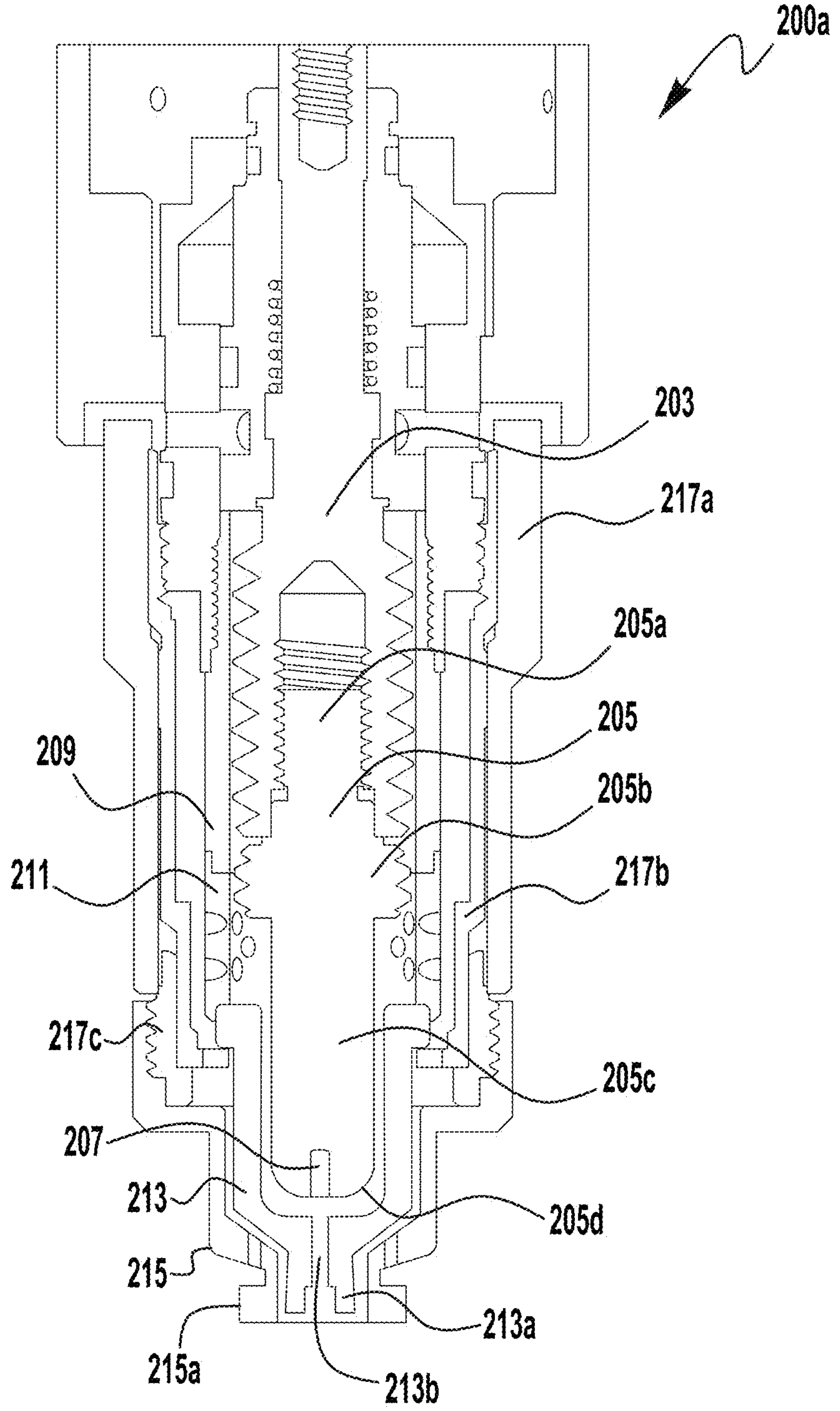
FIG. 2 PRIOR ART
FIG. 2 is a diagrammatical representation of a portion of the head of a torch utilizing known components.

FIG. 2 depicts the cross-section of an exemplary torch head 200*a* of a known construction. It should be noted that some of the components of the torch head 200*a* are not shown for clarity. As shown, the torch 200*a* contains a cathode body 203 to which an electrode 205 is electrically coupled. The electrode 205 is inserted into an inside cavity of a nozzle 213, where the nozzle 213 is seated into a swirl ring 211 which is coupled to an isolator structure 209 which isolates the swirl ring, nozzle etc. from the cathode body 203. The nozzle 213 is held in place by the retaining cap assembly 217*a-c*. As explained previously, this construction is generally known.

As shown, the electrode 205 has a thread portion 205*a* which threads the electrode 205 into the cathode body 203. The electrode 205 also has a center helical portion 205*b*. The helical portion 205*b* has a helical coarse thread-like pattern which provides for flow of the air around the section 205*b*. However, because of this section special tooling is required to remove the electrode 205 from the cathode body 203. Downstream of the center portion 205*b* is a cylindrical portion 205*c*, which extends to the distal end 205*d* of the electrode 205. As shown, the cylindrical portion is inserted into the nozzle 213, such that the distal end 205*d* is close to the throat 213*b* of the nozzle 213. The cylindrical portion can include a flat surface at the center portion 205*b* so that a specialized tool can grab the electrode 205 to remove it from the cathode. Typically, the transition from the cylindrical portion 205*c* to the distal end 205*d* includes a curved edge leading a flat end face on the distal end 205*d*. In a retract start torch this flat end face is in contact with the inner surface of the nozzle 213 to initiate the arc start. Once the arc is ignited the electrode 205 is retracted and a gap is created between the electrode 205 and the nozzle 213 (as shown), at which time the plasma jet is directed through the throat 213*b* of the nozzle 213 to the workpiece. It is generally understood, that with this configuration, known electrodes 205 can begin to fail during arc initiation after about 300 arc starts. Typically, the electrode 205 is chrome or nickel plated to aid in increasing the life of the electrode 205. Once this event begins to occur, the electrode 205 may need to be replaced.

Also, as shown a hafnium insert 207 is inserted into the distal end 205*d* of the electrode 205. It is generally known that the plasma jet/arc initiates from this hafnium insert 207, which is centered on the flat surface of the distal end 205*d*.

As briefly explained above, the torch 200*a* also includes a nozzle 213 which has a throat 213*b* threw which the plasma jet is directed during cutting. Also, as shown the nozzle 213 contains a cylindrical projection portion 213*a* through which the throat 213*b* extends. This projection portion 213*a* provides for a relatively long throat 213*b* and extends into an cylindrical opening in the shield 215, which also has a cylindrical projection portion 215*a*. As shown, and air flow gap is created between each of the projection portions 213*a*/215*a* to allow a shielding gas to be directed to encircled the plasma jet during cutting. In air cooled torches, each of these respective projection portions 213*a*/215*a* direct the plasma jet and shield gas to the getting operation. However, because of the geometry of each of the nozzle 213 and the shield cap 215, these projection portions can tend to heat up significantly. This heat can cause the heat band on the nozzle 213 to extend significantly along its length. This increased heat band and high heat can cause the components to deteriorate and fail, causing the need for replacement. Further, their performance can degrade over time which can cause less than optimal cutting results. Therefore, improvements are needed for known air cooled torch configurations.

Figure 3:
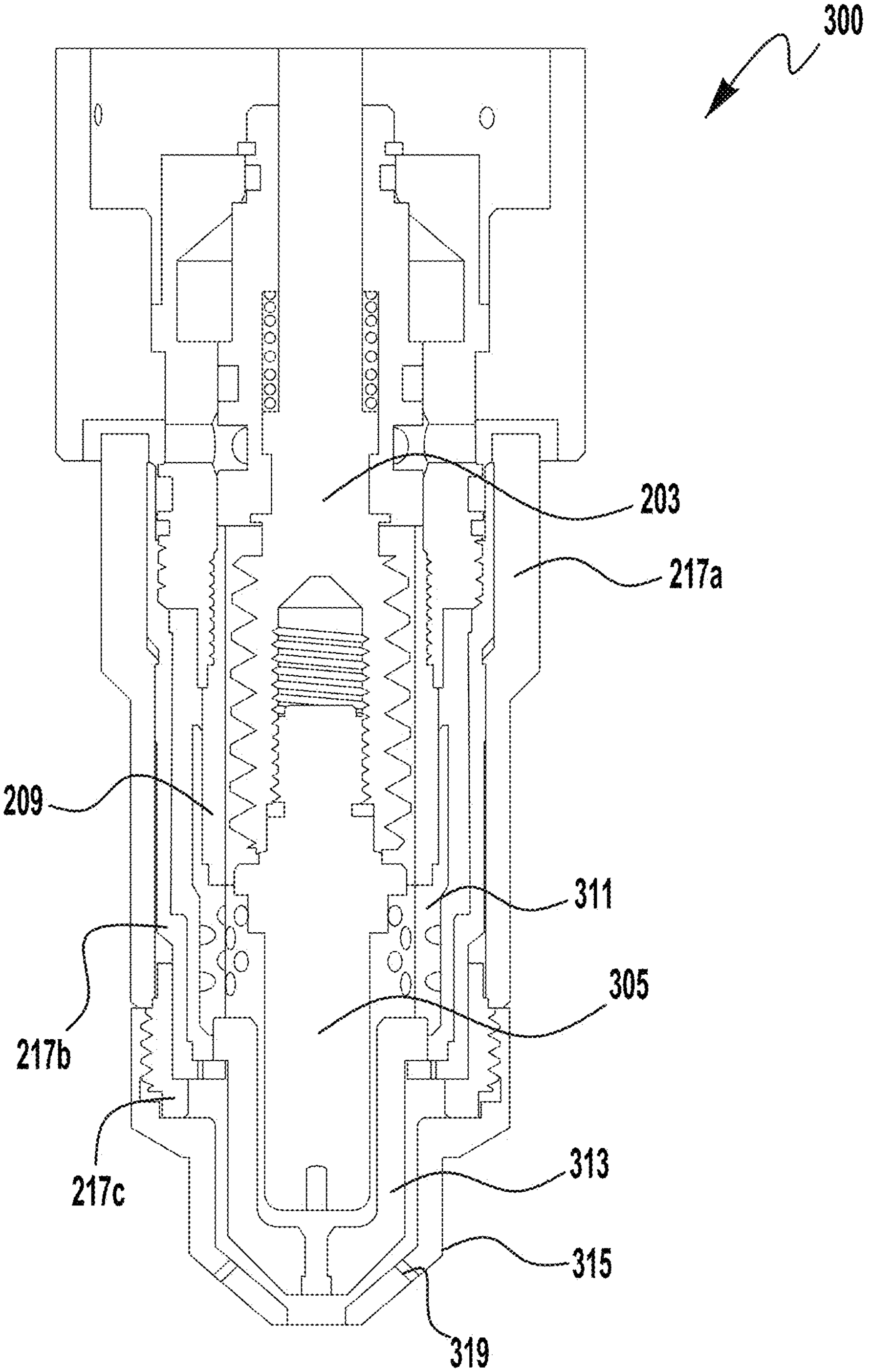
FIG. 3 is a diagrammatical representation of a portion of the head of an exemplary embodiment of a torch of the present invention.

Turning now to FIG. 3, an exemplary embodiment of a torch head 300 is shown. The torch head 300 can be used in the torch 200 shown in FIG. 1, and like FIG. 2, not all of the components and structure is shown to simplify the Figure (for example, handle, outer casing, etc.). Further, in many respects (except those discussed below) the construction and operation of the torch head 300 is similar to known torch heads, such that all of the details of its construction need not be discussed herein. However, as will be explained in more detail below, each of the electrode 305, nozzle 313, shield cap 315 and swirl ring 311 of the torch head 300 are constructed differently than known torches and torch components and provide for a cutting torch with optimized cutting performance and durability. Further, like the torch 200*a* in FIG. 2, the torch 300 in FIG. 3 is an air cooled, retract-type torch. Further understanding of exemplary embodiments of the present invention is provided in the discussions below, in which each of the electrode, nozzle, shield cap and swirl ring are discussed.

Figure 4:
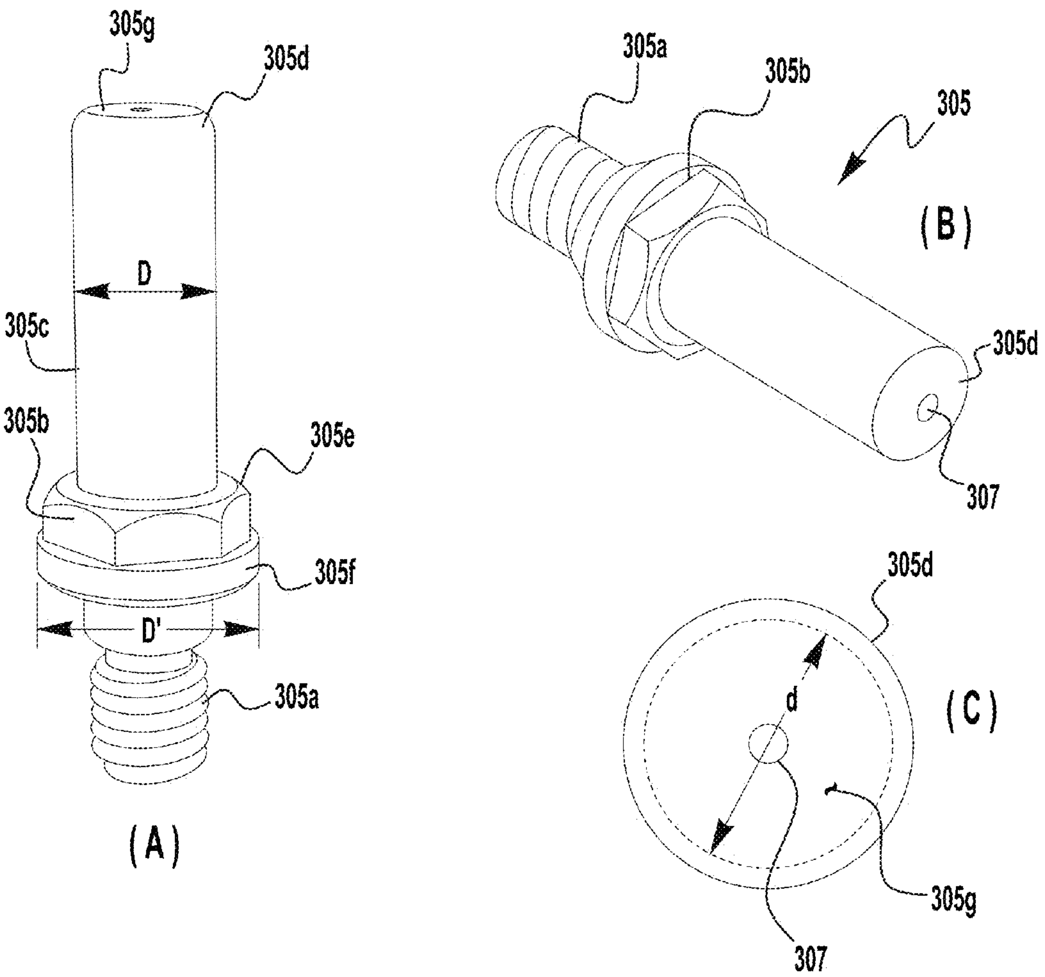
FIGS. 4*a*-4*c* are diagrammatical representations of an exemplary embodiment of an electrode of the present invention.

Turning now to FIGS. 4*a* through 4*c*, an exemplary embodiment of an air cooled electrode 305 of the present invention is shown. The electrode has a thread portion 305*a* which allows the electrode 305 to be secured to the cathode body in the torch head. Adjacent to the thread portion 305*a* is a wider securing portion 305*b* which is larger in diameter than the thread portion 305*a* and the downstream cylindrical portion 305*c* (discussed more below). Unlike known electrodes the securing portion 305*b* has a nut portion 305*e* which is configured to allow a standard socket-type tool to remove and install the electrode 305. As explained previously, known electrodes do not have such a configuration and require a special tool for installation and removal. Embodiments of the present invention allow for standard tools to be used because of the nut portion 305*e*. In the embodiment shown, a six-sided hex-head nut configuration is used. Of course, other standard nut configurations can be used. As shown, adjacent the nut portion 305*e* is a seat portion 305*f* which has the widest diameter D' of the electrode 305. This portion is used in aiding the seating of the electrode 305 within the cathode body.

Adjacent to the nut portion 305*e* is a cylindrical portion 305*c*, which has an end portion 305*d* with a flat end face 305*g*. The cylindrical portion 305*c* has a diameter D, where the ratio of the widest diameter D' to the diameter D is in the range of 1.4 to 1.8, and in other exemplary embodiments is in the range of 1.4 to 1.6. Further, as compared to known air cooled electrodes, which are used for cutting applications in the range of 40 to 100 amps, the diameter D of the cylindrical portion 305*c* is in the range of 15 to 25% larger than the diameter of the cylindrical portion of known electrodes. In exemplary embodiments, the maximum diameter of the cylindrical portion 305*c* is in the range of 0.2 to 0.4 inches. The end portion 305*d* of the electrode 305 has flat surface portion 305*g* which has a hafnium insert 307 inserted into a center point of the flat surface portion 305*g*. The use and function of the hafnium insert 307 is generally known and will not be discussed in detail herein. However, in embodiments of present invention, the hafnium insert 307 is a cylindrically shaped insert which has a length to diameter ratio in the range of 2 to 4, and in other exemplary embodiments the length to diameter ratio is in the range of 2.25 to 3.5. Thus, exemplary embodiments of the present invention allow for optimal current transfer into the insert 307 while at the same time providing optimum heat transfer abilities. As such, the usable life of the hafnium insert and electrode of the present invention is greatly increased over known configurations. It is noted that although the hafnium insert 307 is described as cylindrical it is understood that in some exemplary embodiments, either or both of the ends of the insert 307 may not be flat because, in some exemplary embodiments, the ends may have either a generally concave or convex shape.

As shown in FIGS. 4*a* to 4*c* the end portion 305*d* transitions to the flat surface portion 305*g* via a generally curved edge. The flat surface portion 305*g* is the portion of the face of the end of the electrode 305 which is flat, as opposed to the transition edge which transitions the flat surface portion 305*g* to the side walls of the cylinder portion 305*c*. However, unlike known electrodes, the flat surface portion 305*g* has a diameter such that the ratio of the diameter d to the diameter D is in the range of 0.8 to 0.95. In further exemplary embodiments, the ratio is in the range of 0.83 to 0.91. Such a ratio optimizes the surface contact between the flat surface portion 305*g* and the interior of the nozzle 313 during arc start, while at the same time ensuring that there are minimal heat concentrations and ideal heat transfer between the flat surface portion 305*g* and the cylindrical portion 305*c*. As explained above, in a retract-start, air cooled torch the electrode 305 is placed into contact with the nozzle 313 via the flat surface portion 305*g*. This is typically done by a spring type mechanism (not shown for clarity). This allows an arc to be started between the insert 307 and the nozzle 313 at start and once the shield gas air flows reaches a desired pressure level, the electrode is retracted from the nozzle 313—creating a gap—which then causes the arc to move from the nozzle 313 to the workpiece. By having an electrode 305 with a configuration described above, embodiments of the present invention can significantly increase the usable life of the electrode 305, and thus the torch. This ensures that optimal starting and cutting is maintained with minimal downtime and replacement.

It is further noted that in some exemplary embodiments, the electrode 305 can be made primarily of copper and is not coated with either chrome or nickel.

Figure 5:
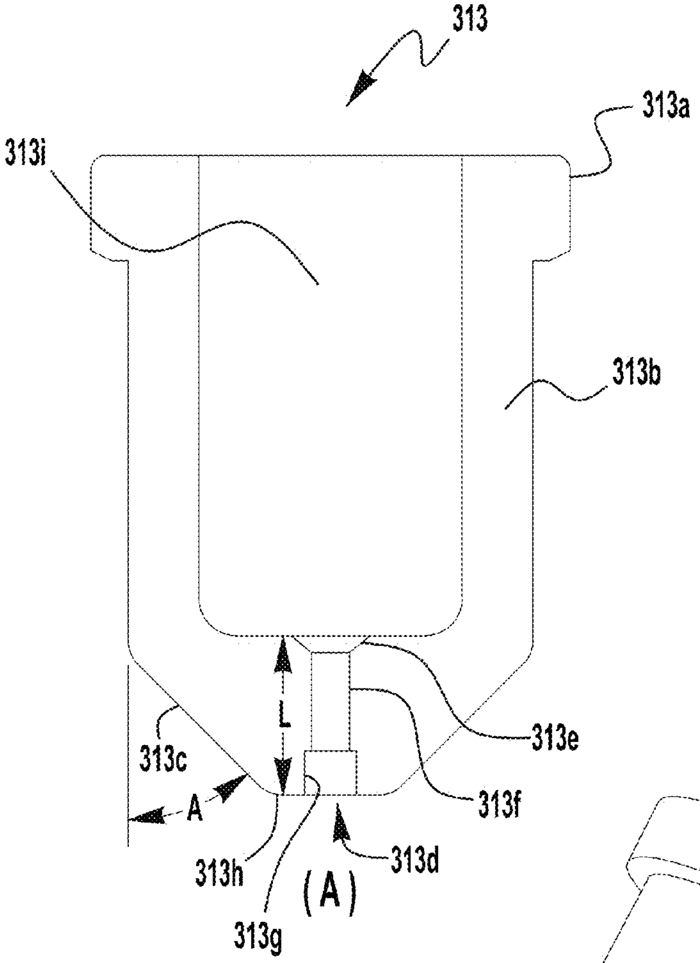
FIGS. 5*a*-5*b* are diagrammatical representations of an exemplary embodiment of a nozzle of the present invention.
Figure 5:
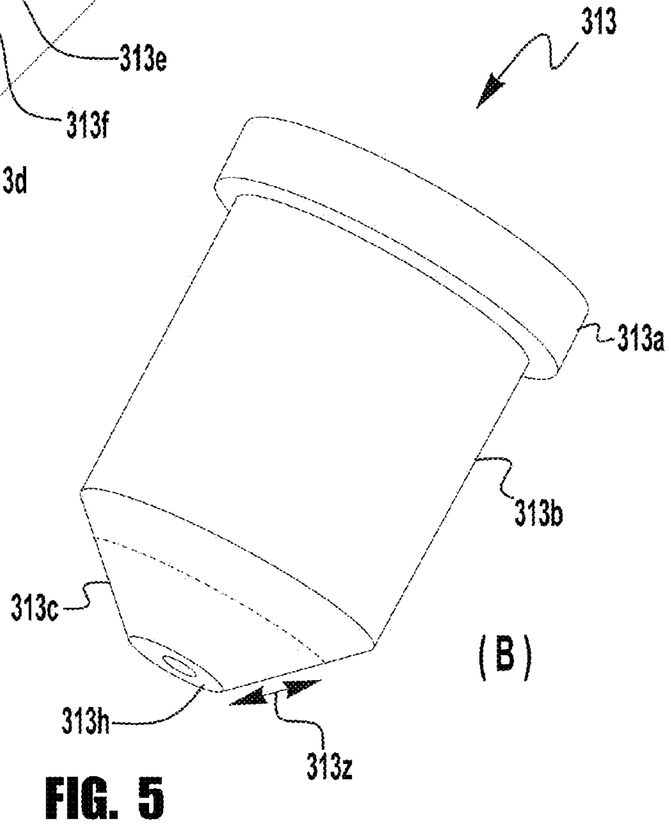

Turning now to FIGS. 5*a* and 5*b*, an exemplary embodiment of a nozzle 313 of the present invention is depicted. The nozzle 313 has an end portion 313*a* which allows the nozzle 313 to be secured by the retainer assembly. Adjacent to the end portion 313*a* is a main cylindrical portion 313*b* which extends from the end portion 313*a* to a tip portion 313*c*, where the tip portion 313*c* transitions the nozzle from the cylindrical portion 313*b* to a tip surface portion 313*h*. Unlike known nozzles, the tip portion 313*c* is an angled portion—as shown—which does not have any additional cylindrical extension portion (e.g., see 213*a* in FIG. 2). Rather, the tip surface portion 313*h* is directly adjacent to the angled surface of the tip portion 313*c* such that the tip portion 313*c* is a truncated cone shape. This is unlike known nozzle configurations for air cooled torches. The angled portion of the tip portion 313*h* has an angle A in the range of 30 to 60 degrees, as shown. In other exemplary embodiments, the angle A is in the range of 40 to 50 degrees. Further, as shown, the nozzle 313 contains a cavity 313*i* into which the electrode 305 is inserted as shown in FIG. 3. The nozzle 313 also has a throat 313*d* through the tip portion 313*c* having a length L, where the throat has a length to diameter ratio in the range of 3 to 4.5, where the diameter is the smallest diameter of the throat 313*d*. In other exemplary embodiments, the ratio is in the range of 3 to 4. The length L is the length of the throat 313*d* from the inner surface of the cavity 313*i* to the tip surface 313*h*. This aspect of the nozzles of the present invention aids in minimizing the voltage drop of the plasma jet/arc along the length of the throat 313*d*. In known nozzles, the voltage drop can be appreciable, thus adversely affecting the operation and effectiveness of the torch. In exemplary embodiments of the present invention, embodiments of the present invention can provide an optimized performance where the maximum voltage drop across the throat is less than 20 volts, regardless of the operational current level and gas flow rates and patterns. In other exemplary embodiments, the maximum voltage drop is in the range of 5 to 15 volts, and in yet further exemplary embodiments, the voltage drop is less than 5 volts. That is, nozzle and throat configurations of embodiments of the present invention can achieve the above optimal voltage drop performance over a current operational range of 40 to 100 amps with all known operational gas flow patterns and rates. This performance has not been attained by known configurations. Also, as shown, the throat 313*d* has an inlet portion 313*e* which transitions from a wider opening to a narrow throat portion 313*f*—which has the smallest diameter of the throat 313*d*. The narrow throat portion 313*f* transitions to a wider expansion portion 313*g* which has an exit diameter that is larger than the diameter of the narrow throat portion 313*f* and is smaller than the diameter than the inlet to the inlet portion 313*e*. That is, the diameter of the inlet to the inlet portion 313*e* is larger than the diameter of the outlet of the expansion portion 313*g*. In exemplary embodiments of the present invention, the ratio of inlet diameter (diameter at most upstream point of inlet 313*e*) to outlet diameter (diameter at most downstream point of expansion 313*g*) is in the range of 1.5 to 4.

Embodiments of the nozzle 313 as described herein have significantly approved thermal properties over known nozzle configurations. Specifically, nozzles of the present invention operate at a much cooler temperature and have a much smaller heat band than known nozzles. Because of the configuration of the known nozzles, their tips can reach very high heat levels, which tends to cause molten spatter to adhere to the tips of the nozzles and can lead to the premature failure of the nozzle. Specifically, embodiments of the present invention provide a heat band which is contained within the tip portion 313*c* and has minimal extension into the cylindrical portion 313*b*. In fact, in some exemplary embodiments, the nozzle 313 and tip 313*c* is configured such that the heat band does not extend to the cylindrical portion 313*b* at all during operation. It should be understood that the heat band is the shortest band (or length) of the nozzle 313, measured from the tip surface 313*h*, in which the average temperature of the nozzle 313 reaches 350 degrees C. during sustained operation 100 amps, where sustained operation is at least an amount of time where the temperature of the nozzle 313 reaches a temperature equilibrium during operation. (Of course, it is to be understood that normal operation includes normal flow of cooling and shielding gas at 100 amps). This is not achievable with known nozzle structures and configurations. An exemplary heat band 313*z* is shown in FIG. 5*b*, where the heat band 313*z* stays within the tip portion 313*c* during normal operation and does not extend to the cylindrical portion 313*b*. Thus, exemplary embodiments of the present invention provide optimized thermal properties to achieve optimized cutting performance and component life. To be clear, it is understood that during operation, the temperature at the tip of the nozzle 313 is the highest, and can reach temperatures of 600 degrees C. In prior nozzle configurations, the heat band typically extends beyond the beyond the nozzle extension portion 213*a* and the tapered portion (see FIG. 2) and extends into the cylindrical portion. Exemplary embodiments of the present invention are considerably improved as the heat band is entirely within the most distal portion of the nozzle—the truncated conical portion—as shown in FIG. 5*b*.

Figure 6:
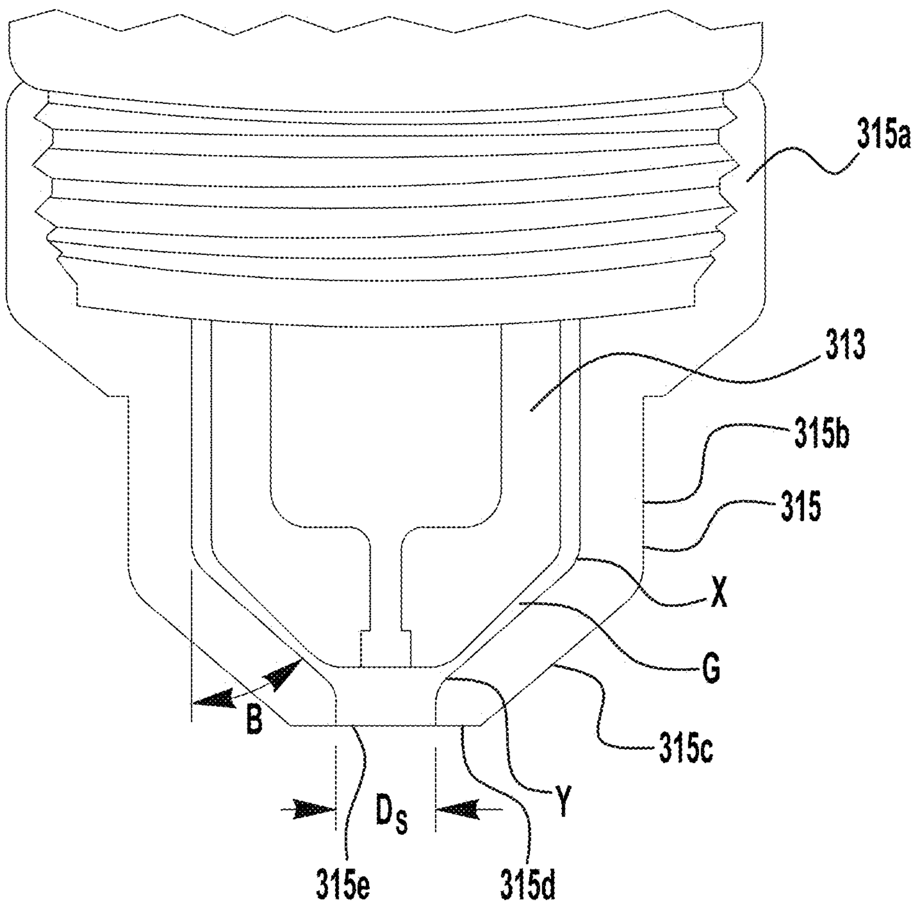
FIG. 6 is a diagrammatical representation of an exemplary embodiment of a shield of the present invention.

FIG. 6 depicts an exemplary embodiment of a shield cap 315 installed on the end of the torch and shielding the nozzle 313. The function of the shield cap is generally known and need not be described in detail herein. However, like the nozzle 313 discussed above, the shield cap 315 does not have the extension portion 215*a* shown in FIG. 2. Instead, like the nozzle 313, the tip of the shield cap is a truncated cone—as shown in FIG. 6. The shield cap 315 has a threaded end portion 315*a* which allows the shield cap to be secured to the retainer assembly 217*c*. The shield cap 315 also has a cylindrical portion 315*b* which is positioned in between the end portion 315*a* and the shield cap tip portion 315*c*. When the torch is assembled the cylindrical portion 315*b* of the shield cap 315 is adjacent to the cylindrical portion 313*b* of the nozzle 313, as shown in FIG. 6, such that a gap exists between the nozzle 313 and the shield cap 315. The shielding gas is directed through this gap during a cutting operation. In exemplary embodiments of the present invention, the gap between the respective cylindrical portions is in the range of 0.01 to 0.06 inches, and in other exemplary embodiments, is in the range of 0.2 to 0.4 inches. Also, as shown, the shield cap 315 has a tip portion 315*c* which is also shaped as a truncated cone having a tip end surface 315*d*. Unlike known shield caps, there is not cylindrical extension portion as shown in FIG. 2. Further, the shield cap 315 has a circular opening 315*e* which is centered on the throat 313*d* when the components are assembled as shown. In exemplary embodiments of the present invention, the opening has a diameter Ds which is in the range of 1.25 to 4.1 times the smallest diameter of the nozzle throat 313*d* (diameter of the narrow throat portion 313*f*). In other exemplary embodiments, the diameter Ds is in the range of 1.75 to 2.5 times the smallest diameter of the throat 313*d*. Further, in exemplary embodiments of the present invention, the diameter Ds is greater than the exit diameter of the throat expansion portion 313*g*, but less than the diameter of the tip surface portion 313*h*. In exemplary embodiments of the present invention, the ratio of the diameter Ds to the diameter of the tip surface portion 313*h* of the nozzle 313 is in the range of 0.98 to 0.9.

Additionally, as shown in FIG. 6, the tip portion 315*c* of the shield cap 315 is constructed such that the interior angled surface 315*f* of the tip portion 315*c* is angled at an angle B which is larger than the angle A (on the nozzle) so that the gap G between the exterior of the nozzle 313 and shield cap 315—in their respective tip regions—decreases in width along the length of the gap G from the upstream end X to the downstream end Y (whereas the angles A and B are measured from a line parallel to the centerline of the torch). In exemplary embodiments of the present invention, the angle B is in the range of 35 to 70 degrees, but is larger than the angle A. In other exemplary embodiments, the angle B is in the range of 45 to 60 degrees. That is, the gap distance between the interior surface of the shield cap 315 at the beginning (point x) of the tip portion 315*c* and the exterior of the nozzle (measured normal to the interior surface of the shield cap) is greater than the gap distance between the interior surface of the shield cap 315 at the end (point y) of the tip portion 315*c* and the exterior of the nozzle (measured normal to the interior surface of the shield cap). By decreasing the width of the gap G the shield gas air flow is accelerated near the exit of the torch—which aids in stabilizing the plasma jet and improves performance of the torch. In exemplary embodiments of the present invention, the width of the gap at point X is in the range of 0.03 to 0.05 inches. Further, in exemplary embodiments, the width of the of the gap G decreases by 30 to 60% from point X to point Y. For clarity, the point X is located at the widest point between the interior of the shield cap 315 and the exterior of the nozzle 313, along their respective tip portions, and the point Y is located at the narrowest point between the interior of the shield cap 315 and the exterior of the nozzle 313, along their respective tip portions. It is noted that while in some exemplary embodiments, the point Y is located at the transition between the exterior angled surface of the nozzle tip portion 313*c* to the tip surface 313*h*, this may not be the case in other exemplary embodiments. Improved torch performance and durability can be achieved by incorporating exemplary embodiments of the components discussed above.

It is also noted that in some exemplary embodiments, the shield cap 315 can have additional gas flow ports 319 (depicted in FIG. 3). These ports 319 provide additional gas flow to the cutting area and can help cool the shield cap and keep debris away from the cutting area.

Figure 7:
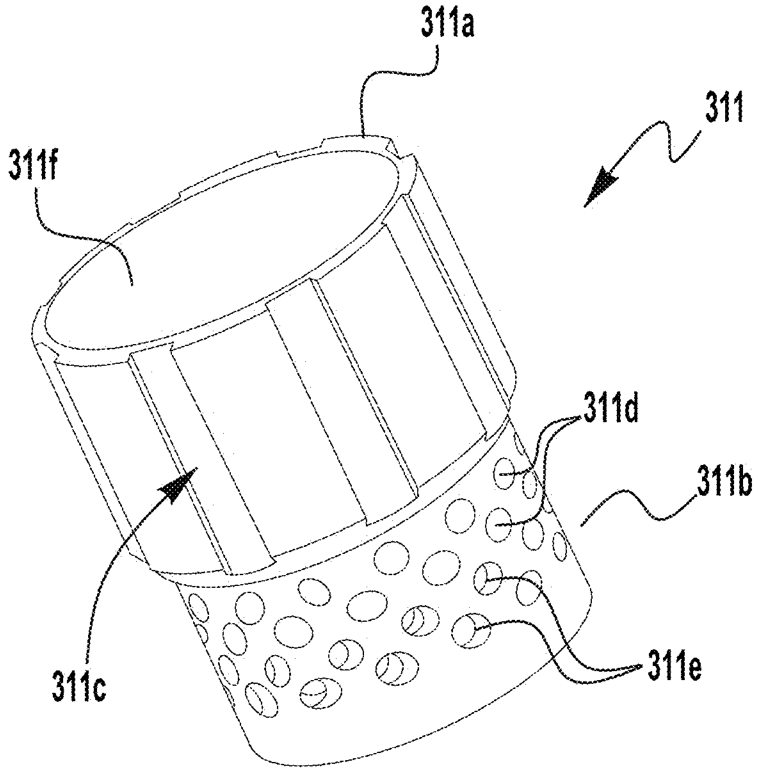
FIG. 7 is a diagrammatical representation of an exemplary embodiment of a swirl ring of the present invention.

Turning now to FIG. 7, an exemplary embodiment of a swirl ring 311 is depicted. Unlike existing swirl rings, embodiments of the present invention have two regions, an upper region 311*a* and a lower region 311*b*. Known swirl rings typically have a single region having a constant outside diameter along its entire length, and where the length of the ring is relative short as compared to what is shown in FIG. 7. For example, as shown in FIG. 2, the swirl ring 211 extends from the top edge of the nozzle 205 to the bottom of the isolator 209. However, this configuration can lead to early failure of the swirl ring 211, particularly at the top of the swirl ring 211 where it connects with the isolator 209. Exemplary embodiments of the present invention eliminate this failure mode, as well as improve the overall performance of the ring and the torch. As shown in FIG. 7, the upper portion 311*a* has a larger outer diameter than the lower region 311*b*, and in some exemplary embodiments has a length longer than that of the lower region 311*b*. This upper region has a cavity 311*f* into which the isolator 209 is inserted (see FIG. 3). This insertion aids in strengthening and centering of the swirl ring 311. The swirl ring 311 can be press fit, screwed onto, or simply seated with the isolator 209. On the outside surface of the upper portion 311*a* of the ring 311 are a plurality of channels 311*c*. The channels 311*c* aid in stabilizing the gas flow to the bottom portion 311*b* of the swirl ring 311. Known torches do not employ such flow channels, and as such the gas flow can be turbulent as it reaches the swirl ring. This turbulent flow can compromise the performance of the torch. Embodiments of the present invention use the channels 311*c* to stabilize the gas flow from the upper regions of the torch head to the lower portion 311*b* of the ring 311. The stabilized flow is then directed to the holes 311*d*/311*e* in the bottom portion 311*b* and because the flow has been stabilized the performance of these holes are optimized. As shown, the bottom portion 311*b* has a plurality of gas flow holes 311*d*/311*e* which pass from the outer surface of the bottom portion 311*b* to an inner cavity of the bottom portion 311*b*. In some exemplary embodiments, the channels 311*c* run along the entire length of the upper portion and run parallel to a centerline of the swirl ring. However, in other exemplary embodiments, the channels 311*c* can run along only a portion of the length of the upper portion, and in further embodiments, the channels can be angled such that they impart a swirl flow to the gas passing through the channels. As shown, exemplary embodiments have at least four rings of holes, where at least two upper rings 311*d* have a first hole configuration and at least two lower rings 311*e* have a second configuration. The operation of the holes will be discussed below.

As discussed previously, prior to start of the torch, the nozzle and the electrode are in contact with each other. This can be attained via a mechanical spring bias. When the operation is started, both current and gas is caused to flow. The current ignites the arc and the gas pressure will cause the cathode/electrode to be pushed away from the nozzle—pushing against the spring bias. In exemplary embodiments of the present invention, the upper holes 311*d* facilitate this retraction via the gas pressure. That is, the holes 311*d* are formed such that each of their respective centerlines is perpendicular to the centerline of the ring 311. Further, in exemplary embodiments of the present invention, all of the holes 311*d* have the same dimensions (e.g., diameter) and each of the upper rows of holes 311*d* have the same number of holes 311*d* (i.e., same radial spacing). However, in other exemplary embodiments the holes 311*d* can have varying diameters (e.g., two sets of holes, a first diameter and a second diameter), and/or each of the rows of holes 311*d* can have different hole spacing. That is, in some exemplary embodiments, the row of holes 311*d* closet to the upper portion 311*a* can have less or more holes 311*d* than the adjacent row of holes. The configuration can be optimized to achieve the desired performance. In the embodiment shown in FIG. 7 the holes 311*d* have a cylindrical shape (circular cross-section), however in other exemplary embodiments, at least some of the holes can have non-circular cross-sections (e.g., elliptical, oval, etc.).

Unlike the upper rows of holes 331*d*, the bottom rows of holes 311*e* are used to provide a swirl or rotation to the gas as it flows into the cavity adjacent the electrode 305. Thus, in exemplary embodiments of the present invention, the bottom rows of holes 311*e* have a different hole geometry, where the centerlines of the holes are angled with respect to the centerline of the ring 311. This angling directs the gas flow in such a way as to impart improved rotation in the gas flow. In exemplary embodiments of the present invention, the holes 311*e* are angled such that the centerlines of each of the respective holes 311*e* are have an angle in the range of 15 to 75 degrees relative to the centerline of the ring 311. In other embodiments, the angle is in the range of 25 to 60. In exemplary embodiments, the holes 311*e* are formed such that, while they are angled to the centerline of the ring 311 they are oriented such that their respective centerlines lie in a plane cutting through the ring 311 at the centerline of the holes 311*e*. That is, all of the holes centerlines are co-planar. However, in other exemplary embodiments, the holes 311*e* can also be angled such that their centerlines are not co-planar. That is, in some embodiments, the hole centerlines are angled towards the end bottom end of the ring 311 (i.e., angled towards the end of the torch). Such embodiments will impart both a swirl flow to the gas flow, but also project the gas flow downward.

Much like the holes 311*d* in the upper rows, the holes 311*e* in the lower rows can have the same geometry and orientation, and there can be the same number of holes in each of the respective rows. However, in other exemplary embodiments, this need not be the case. For example, in some embodiments the holes 311*e* can have different diameters and/or cross-sections. Further, embodiments can utilize a different number of holes in each of the respective rows. Additionally, the angling of the holes can be varied, where a first grouping of holes 311*e* has a first angle relative to the ring centerline, and a second group of holes 311*e* has a second angle relative to the ring centerline. Further, in even other exemplary embodiments the holes 311*e* can have different orientations, where some holes are angled down and other are not, and can be angled down at a different angle. As an example, every other hole 311*e* within each respective row can have a different geometry/orientation, or the holes 311*e* in one row (the row adjacent the upper rows) can have a first geometry/orientation, while the holes 311*e* in the most distal row (away from the upper holes) can have a second geometry/orientation. As another example, in some exemplary embodiments, the lowest row of holes 311*e* (closet to the bottom of the ring 311) are angled both radially and downwardly, whereas the adjacent row of holes 311*e* are only angled radially. Of course the opposite configuration can also be used. Thus, embodiments of the present invention allow for the gas flow to be optimized—which greatly improves the performance of the torch and the stability of the plasma jet.

Figure 8:
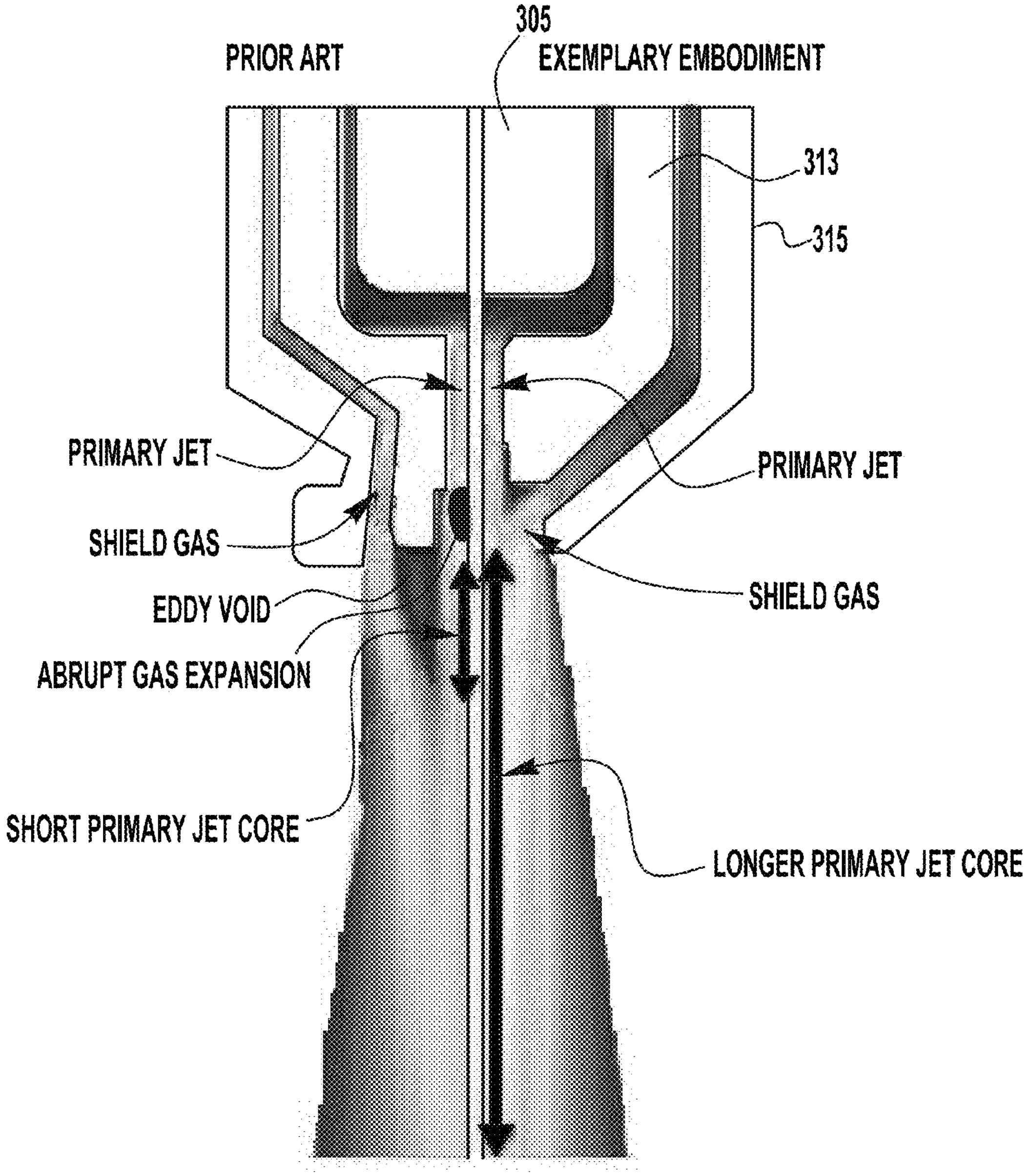
FIG. 8 is a diagrammatical representation of a comparison between the plasma arc and plasma jet flow of embodiments of the present invention, as compared to known air cooled torch configurations.

FIG. 8 depicts an exemplary comparison between the performance of a known torch and an exemplary torch of the present invention. As can be seen, various advantages can be achieved with embodiments of the present invention. For example, as shown with the prior art torch, the primary jet of the plasma core is very short and there is an abrupt gas expansion and high heat concentration at the exit of the nozzle. Further, because the shield gas exits the shield cap remote from the nozzle exit an eddy can be created in the region between the shield gas and the nozzle jet. This eddy can cause molten spatter to be retained in this region long enough to be adhered to the surface of the nozzle—ultimately causing early failure of the torch and its components, or otherwise degrading the cutting operation. This is to be compared to an exemplary torch of the present invention (right side). As shown, there is a more controlled exist velocity at the exit of the nozzle and little or no heat concentration at the exit of the nozzle and the primary jet core is considerably longer. This allows for more stable and consistent cutting of high thickness materials. Further, there is no eddy region which will allow spatter to be adhered to the nozzle 313.

Therefore, various embodiments of the present invention, provide an improved air cooled, retract type cutting torch which can provide more precision for a longer period of type and a larger number of start cycles. For example, in embodiments of the present invention which use a cutting current in the range of 40 to 100 amps, embodiments of the present invention can more than double the number of arc starts that can occur before an arc start failure occurs. This represents a significant improvement over known air cooled torch configurations.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

I claim:

1. An electrode for an air cooled plasma torch, said electrode comprising:

a thread portion having a thread to secure said electrode;

a securing portion positioned downstream of said thread portion, in an electrical current flow direction, where said securing portion comprises a large diameter portion having a diameter which is the largest diameter of said electrode and a nut portion, where said nut portion is positioned downstream of said large diameter portion and where said nut portion is configured to be engageable with a standard nut removal tool, a cylindrical portion downstream of said nut portion, said cylindrical portion having a maximum outer diameter such that the ratio of the diameter of the large diameter portion to said maximum diameter of said cylindrical portion is in the range of 1.4 to 1.8, and where said cylindrical portion comprises a distal end which has a circular flat end surface; and a hafnium insert inserted into said distal end of said cylindrical portion, said hafnium insert has a cylindrical shape having a length to diameter ratio in the range of 2 to 4;

wherein said circular flat end surface has a diameter such that the ratio of the diameter of said circular flat end surface to said maximum diameter of said cylindrical portion is in the range of 0.8 to 0.95.

2. The electrode of claim 1, wherein said ratio of the diameter of the large diameter portion to said maximum diameter of said cylindrical portion is in the range of 1.4 to 1.6.

3. The electrode of claim 1, wherein said electrode is an air cooled electrode which is used for cutting operations in the range of 40 to 100 amps.

4. The electrode of claim 1, wherein said maximum outer diameter of said downstream cylindrical portion is in the range of 0.2 to 0.4 inches.

5. The electrode of claim 1, wherein said length to diameter ratio of said hafnium insert is in the range of 2.25 to 3.5.

6. The electrode of claim 1, wherein said circular flat end surface has a diameter d and a ratio of said diameter d to said maximum outer diameter of said downstream cylindrical portion is in the range of 0.8 to 0.95.

7. The electrode of claim 1, wherein said circular flat end surface has a diameter d and a ratio of said diameter d to said maximum outer diameter of said downstream cylindrical portion is in the range of 0.83 to 0.91.

8. The electrode of claim 1, wherein said nut portion is a six sided hex nut.

9. The electrode of claim 1, wherein said electrode is an air cooled electrode which is used for cutting operations in the range of 40 to 100 amps, wherein said circular flat end surface has a diameter d and a ratio of said diameter d to said maximum outer diameter of said downstream cylindrical portion is in the range of 0.8 to 0.95, and wherein said maximum outer diameter of said downstream cylindrical portion is in the range of 0.2 to 0.4 inches.

10. An air cooled plasma torch, said torch comprising:

an electrode having a hafnium insert from which a plasma jet is originated for cutting a workpiece; and a nozzle having a cylindrical portion with a cavity and a conical shaped downstream portion with a throat at a distal end of said downstream portion, where said electrode is inserted into said cavity such that said plasma jet is directed through said throat, wherein said electrode further comprises:

a thread portion having a thread to secure said electrode in said torch;

a securing portion positioned downstream of said thread portion, in an electrical current flow direction, where said securing portion comprises a large diameter portion having a diameter which is the largest diameter of said electrode and a nut portion, where said nut portion is positioned downstream of said large diameter portion and where said nut portion is configured to be engageable with a standard nut removal tool, and a cylindrical portion downstream of said nut portion, said cylindrical portion having a maximum outer diameter such that the ratio of the diameter of the large diameter portion to said maximum diameter of said cylindrical portion is in the range of 1.4 to 1.8, and where said cylindrical portion comprises a distal end which has a circular flat end surface;

wherein said hafnium insert has a cylindrical shape having a length to diameter ratio in the range of 2 to 4; and wherein said circular flat end surface has a diameter such that the ratio of the diameter of said circular flat end surface to said maximum diameter of said cylindrical portion is in the range of 0.8 to 0.95.

11. The torch of claim 10, wherein said ratio of the diameter of the large diameter portion to said maximum diameter of said cylindrical portion is in the range of 1.4 to 1.6.

12. The torch of claim 10, wherein said electrode is an air cooled electrode which is used for cutting operations in the range of 40 to 100 amps.

13. The torch of claim 10, wherein said maximum outer diameter of said downstream cylindrical portion is in the range of 0.2 to 0.4 inches.

14. The torch of claim 10, wherein said length to diameter ratio of said hafnium insert is in the range of 2.25 to 3.5.

15. The torch of claim 10, wherein said circular flat end surface has a diameter d and a ratio of said diameter d to said maximum outer diameter of said downstream cylindrical portion is in the range of 0.8 to 0.95.

16. The torch of claim 10, wherein said circular flat end surface has a diameter d and a ratio of said diameter d to said maximum outer diameter of said downstream cylindrical portion is in the range of 0.83 to 0.91.

17. The torch of claim 10, wherein said nut portion is a six sided hex nut.

18. The torch of claim 10, wherein said electrode is an air cooled electrode which is used for cutting operations in the range of 40 to 100 amps, wherein said circular flat end surface has a diameter d and a ratio of said diameter d to said maximum outer diameter of said downstream cylindrical portion is in the range of 0.8 to 0.95, and wherein said maximum outer diameter of said downstream cylindrical portion is in the range of 0.2 to 0.4 inches.

* * * * *